United States Patent Office 3,176,626
Patented Apr. 6, 1965

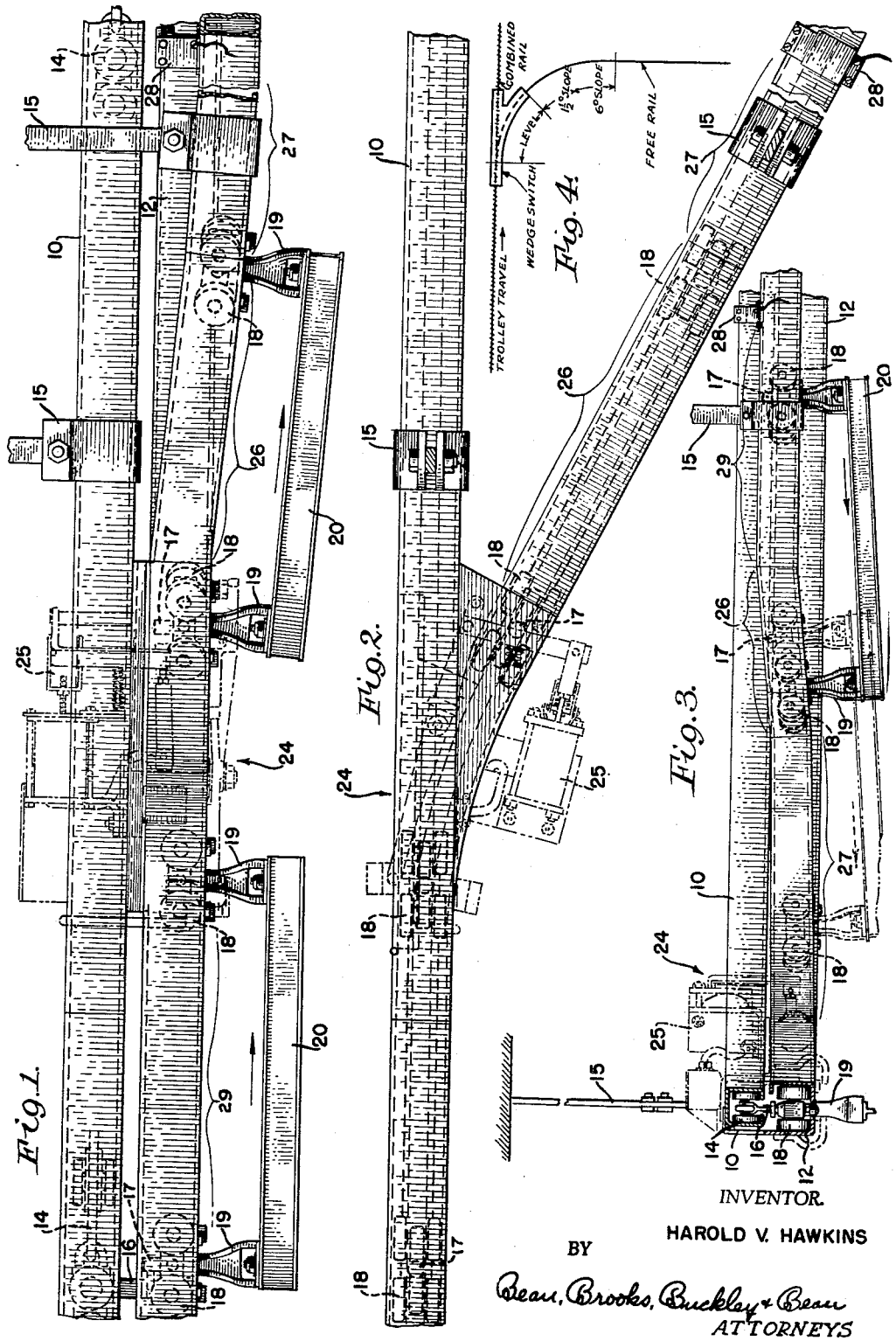

3,176,626
TROLLEY CONVEYOR TRACK SYSTEM
Harold V. Hawkins, Clarence, N.Y., assignor to Columbus McKinnon Corporation, Tonawanda, N.Y.
Filed June 13, 1963, Ser. No. 287,579
3 Claims. (Cl. 104—96)

This invention relates to trolley type conveyor systems; and more particularly to improvements in systems comprising powered main lines and "free" branch lines interconnected by track switch means, as shown and described for example in U.S.A. Patent 3,064,586 of November 20, 1962.

A problem inherent in connection with the travel of interconnected "Tandem" type trolley devices through switches connecting a "free" branch track to a powered main track, is that the trolley roller movements are invariably snubbed by roller friction effects as the unit moves through the directional change track portion of a switch mechanism, as well as because of disengagement of the trolley from the "pusher" device of the power chain as the unit enters the curved track portion. Hence, in prior systems of the type referred to, "free" trolleys are propense to slowing down when negotiating switch mechanisms, and/or stopping with portions thereof disposed in line with the travel of the power chain through the switch area. Thus, the trolley units tend to remain "captive" by the switch mechanisms, whereby the next following trolley units are sometimes jammed and the system operation thereby disrupted.

Various mechanisms designed to accelerate movements of free trolleys through switch areas have been proposed, but have been rather complicated in design and mode of operation, and/or have been otherwise disadvantageous; and it is a primary object of the present invention to provide a trolley conveyor track system arrangement so as to improve the rolling characteristics of "free" trolley units of the tandem trolley type throughout the system switch areas; without use of complicated and/or otherwise undesirable mechanisms. Other objects and advantages of the invention will appear from the specification hereinafter and the accompanying drawing wherein:

FIG. 1 is a side elevational view of a portion of a trolley conveyor main line powered track system having in conjunction therewith a free trolley exit switch and an improved branch track arrangement of the invention;

FIG. 2 is a plan view of the mechanism of FIG. 1;

FIG. 3 is a side elevational view of a portion of a "free" branch trackway leading through a switch into a main powered trackway system, and embodying the features of the present invention; and FIG. 4 is a diagrammatic plan view corresponding to FIG. 2 but of a somewhat modified form of "free" branch trackway of the invention.

As shown in the drawing herewith, the invention may be embodied in an overhead trolley type load conveyance system which typically includes a main trackway section illustrated herein to comprise an upper power chain track portion 10 and a lower trolley track portion 12. A power chain as indicated at 14 runs in the track 10 and trains around appropriate drive sprockets and idler sheaves (not shown). At intervals therealong the power chain 14 carries driving dogs 16 which project downwardly therefrom through a slot in the bottom of the track housing 10 into abutting registry with upstanding lugs 17 on the trolley roller units 18 which run in the lower track 12. Each tandem trolley unit includes a pair of trolley roller devices each carrying a hanger 19; the hangers 19 being bolted to opposite ends of a load carrying hanger bar 20.

The present invention has particular relation to the switch and branch track portions of such systems; a typical switch portion of the track system being indicated generally at 24 herein. As explained hereinabove, whenever a trolley unit is diverted by a track switch and drawn sidewise from the power chain to travel into a side track, the roller units thereof are frictionally snubbed as the units negotiate the directional change track portion of the switch arrangement. Thus, free travel of the leading roller unit is initially resisted. This retardation effect backs up through the hanger bar 20 while the trailing roller device is still in the main "straight-away" portion of the track system, and while still being "straight-away" pushed by the power chain. In devices of the prior types this prevents a clean "breakaway" of the trolley from the power chain as the trailing roller unit enters the switch device, and interferes with normal travel in the main trackway.

To avoid these difficulties and disadvantages, the present invention contemplates that adjacent each "exit" switch the branch tracks, as indicated generally at 26, are provided with short sections which sharply incline downwardly at such angles as to provide a gravity pull upon the leading roller device of the tandem unit as the trailing roller device enters the switch. Thus, as the leading roller device runs down the incline, the gravity forces acting on the leading end of the trolley unit compensate for the increased resistance to travel through the directional change portion of the switch arrangement; and this gravity pull is transmitted through the bar 20 to the trailing roller unit. Thus the movement of the unit is eased through the switch section of the system; and this action promptly clears the main trackway whenever a trolley unit is switched "free" into a branch track. A power cylinder 25 serves to actuate the switch.

This arrangement of the invention distinguishes from the use of simple, gradually inclined, "gravity" type branch tracks which are sometimes employed in lieu of level "powered" trackways, because the present invention is not concerned with provision of a gravity-operated trackway per se. The invention is concerned only with means for smoothly moving a freed tandem trolley unit of substantial length through a relatively sharp turn-off switch section. This purpose is accomplished by providing a relatively short and sharply downwardly inclined section of trackway at a specific location (depending on the length of the trolley bar) adjacent the switch turn-off track portion; which sharply inclined track section is usually of a length less than the distance between the roller devices of the tandem trolley unit. Thus, as shown in FIG. 1, and perhaps more clearly in FIG. 3, the sharply inclined track section 26 is inclined at a much greater angle than the angle of inclination of the adjacent typical gravity-powered "free" track section, as indicated at 27.

Furthermore, it is a particular feature of the arrangement of the present invention that the sharply inclined track section is so located in the plan form of the track system that the leading trolley device of each tandem unit is in the process of descending the sharply sloping track piece when the power chain pusher lug disengages from the trailing roller device of the same tandem trolley unit. Thus, the gravity pull upon the forward end of the unit operates to assist in freeing the push connection between the power chain and the trolley unit, and furthermore acts to accelerate the pull-away movement of the trolley unit through the switch and into the branch trackway. Only an initial accelerating impetus is required, and desirable, to ease the exit operation and to attain the purposes of the invention, because it is undesirable in such situations that the freed trolley unit be given any appreciable acceleration such as would project it into the branch trackway at an undesirably high speed. For the same reason, a simple downwardly inclined branch trackway arrangement would not suffice for the purposes of the present invention because if the incline angle were arranged to be sufficient to provide an appropriate initial pull upon the tandem trolley unit as explained hereinabove, the inclined trackway arrangement would impart to the freed trolley an undesirably high exit and roll-off speed.

FIG. 3 illustrates how the features of the invention may be incorporated in a re-entry switch arrangement wherein free trolley units on a branch track are fed (either manually or by use of a conventional gravity-powered inclined branch track arrangement) to the main powered trackway. It is to be understood that FIG. 3 is a fragmentary vertical sectional view through the main powered trackway and an incoming switch device associated with trolley track portion 12; the main powered and branch trackways being shown in the background as curving off to the right and therefore further shown in elevation in FIG. 3. In this case the branch trackway is illustrated as including a main track portion 29 which feeds a conventionally inclined "gravity-powered" entry switch portion 27 arranged in communication with the main chain powered trackway system comprising components 10, 12. Here again, a sharply inclined track section 26 is provided to operate automatically to give the tandem trolley unit momentarily increased impetus to compensate for the resistance of the switch curve to smooth movement of the unit, as explained hereinabove.

Whereas FIG. 2 illustrates the system of the invention in conjunction with a 45 degree switch and branch track arrangement, the invention is of course adaptable with equal facility to any other type switch and branch track arrangement. For example, FIG. 4 diagrammatically illustrates in plan view a 90 degree switch and branch track arrangement; and furthermore illustrates how combinations of variously inclined short branch track sections may be employed to effect the desired "easing" of the elongate tandem trolley units through the switch mechanism in accordance with the present invention. Thus, as indicated for example in FIG. 4, an initial exit slope of say 1½ degrees may be provided in the curved branch track portion immediately adjacent the switch plate, while a substantially steeper short length branch track section, inclined say 6 degrees, may be provided next adjacent thereto. Thus, it will be appreciated that various combinations of short length branch track sections of different degrees of inclination may thus be employed adjacent both exit and re-entry switches to give the desired "easing" effect on the conveyor trolleys as they exit or re-enter the powered trackway system, as explained hereinabove.

It will of course be appreciated that whereas only a few forms of the invention have been illustrated and described in detail hereinabove, various changes may be made therein without departing from the spirit of the invention or the scope of the following claims.

I claim:
1. In a trolley system, in combination,
a trolley track running along a given course and including a switch device having a branch deviating from said given course,
a trolley device having a pair of roller units disposed in predetermined longitudinally spaced relation,
a power chain assembly disposed above said track along said course and including a depending dog adapted to engage said trolley device and move it along said course,
a free track leading to but spaced from said branch of the switch device and having a given inclination with respect to the horizontal for feeding said trolley device therealong under the influence of gravity,
a sharply inclined track section joining said free track to said branch of the switch device, said track section having an inclination substantially greater than the inclination of said free track and being of a length less than said predetermined spacing between the roller units of said trolley device.

2. In a trolley system, in combination,
a main track section for guiding trolleys along a given course and including a switch device having a branch leading away from said course,
a trolley having a pair of roller units received in said main track section, said roller units being longitudinally spaced apart by a predetermined amount,
means for engaging said trolley and moving it in said main track section along said course,
a sharply inclined track section leading from said branch,
and a gently inclined track section leading from said sharply inclined track section,
said sharply inclined track section being of a length in the order of the spacing between said roller units.

3. In a trolley system, in combination,
a main track defining at least a portion of a given course and including a switch device having a branch leading away from said course,
a trolley having longitudinally spaced roller units engaging said main track,
means for pushing said trolley along said course to said switch device and into said branch thereof,
an inclined track section for receiving a trolley from said branch and moving the trolley therealong under the influence of gravity,
and means for transferring said trolley from said branch to said inclined track section under gravity influence greater than that acting upon said trolley when engaged upon said inclined track section.

References Cited by the Examiner

UNITED STATES PATENTS

| | | | |
|---|---|---|---|
| 896,499 | 8/08 | Witthoefft | 104—99 |
| 2,832,297 | 4/53 | Daniels | 104—91 |
| 2,918,881 | 12/59 | Klamp et al. | 104—88 |

LEO QUACKENBUSH, *Primary Examiner.*